United States Patent
Moss

(10) Patent No.: US 11,029,405 B2
(45) Date of Patent: Jun. 8, 2021

(54) FMCW VEHICLE RADAR SYSTEM

(71) Applicant: VEONEER SWEDEN AB, Vargarda (SE)

(72) Inventor: Jonathan Moss, Haimhausen (DE)

(73) Assignee: VEONEER SWEDEN AB, Vargarda (SE)

( * ) Notice: Subject to any disclaimer, the term of this patent is extended or adjusted under 35 U.S.C. 154(b) by 476 days.

(21) Appl. No.: 15/575,257

(22) PCT Filed: May 17, 2016

(86) PCT No.: PCT/EP2016/061014
§ 371 (c)(1),
(2) Date: Nov. 17, 2017

(87) PCT Pub. No.: WO2016/184850
PCT Pub. Date: Nov. 24, 2016

(65) Prior Publication Data
US 2018/0136328 A1    May 17, 2018

(30) Foreign Application Priority Data
May 20, 2015    (EP) .................... 15168508

(51) Int. Cl.
*G01S 13/931*    (2020.01)
*G01S 7/35*    (2006.01)
(Continued)

(52) U.S. Cl.
CPC ............ *G01S 13/931* (2013.01); *G01S 7/354* (2013.01); *G01S 13/343* (2013.01);
(Continued)

(58) Field of Classification Search
CPC ....... G01S 13/343; G01S 7/354; G01S 13/931
(Continued)

(56) References Cited

U.S. PATENT DOCUMENTS 7,420,502 B2 * 9/2008 Hartzstein ............. G01S 13/343
342/70
8,203,481 B2 * 6/2012 Wintermantel ......... G01S 7/023
342/112

(Continued)

FOREIGN PATENT DOCUMENTS

| EP | 1 806 598 A1 | 7/2007 |
| EP | 2 818 887 A1 | 12/2014 |

OTHER PUBLICATIONS

International Search Report and the Written Opinion of PCT/EP2016/061014, dated Jul. 18, 2016.

*Primary Examiner* — Marcus E Windrich
(74) *Attorney, Agent, or Firm* — Dickinson Wright PLLC; James Purrington

(57) ABSTRACT

A vehicle radar system having a signal generator (13) that generates a FMCW chirp signal (4) with a plurality of frequency ramps (r) running between a first frequency ($f_{start}$) and a second frequency ($f_{stop}$). At the second frequency ($f_{stop}$), the signal generator (13) is controlled to output an output signal (4) with an output frequency ($F_{out}$) for initializing a further frequency ramp (r') using a frequency control signal (31) corresponding to a desired frequency (39) with an initial desired frequency part (39a) and at least one further desired frequency part (39b). The initial desired frequency part (39a) runs from the second frequency ($f_{stop}$) to an intermediate frequency ($f_i$) between the first and second frequency ($f_{start}$, $f_{stop}$)), and the further desired frequency part (39b) runs from the intermediate frequency ($f_i$) to the first frequency ($f_{start}$). The duration of the initial desired frequency part (39a) falls below the duration of the further desired frequency part (39b).

16 Claims, 4 Drawing Sheets

(51) Int. Cl.
*G01S 13/34* (2006.01)
*G01S 13/58* (2006.01)

(52) U.S. Cl.
CPC ....... *G01S 13/584* (2013.01); *G01S 2007/356* (2013.01); *G01S 2013/93271* (2020.01); *G01S 2013/93275* (2020.01)

(58) Field of Classification Search
USPC .................................................... 342/70–72
See application file for complete search history.

(56) References Cited

U.S. PATENT DOCUMENTS

| | | | | |
|---|---|---|---|---|
| 8,599,062 | B2* | 12/2013 | Szajnowski | G01S 13/584 342/109 |
| 8,638,139 | B2* | 1/2014 | Keaveney | H03L 7/197 327/156 |
| 8,654,006 | B2* | 2/2014 | Landez | G01S 7/032 342/103 |
| 2005/0179582 | A1* | 8/2005 | Woodington | H01Q 1/3283 342/70 |
| 2011/0285575 | A1* | 11/2011 | Landez | G01S 7/032 342/70 |
| 2016/0124086 | A1* | 5/2016 | Jansen | G01S 13/931 342/93 |
| 2017/0023662 | A1* | 1/2017 | Ding | G01S 7/023 |

\* cited by examiner

FMCW VEHICLE RADAR SYSTEM

CROSS-REFERENCE TO RELATED APPLICATIONS

This application is a 35 U.S.C. § 371 national phase application of PCT International Application No.: PCT/EP2016/061014, filed May 17, 2016, which claims the benefit of priority under 35 U.S.C. § 119 to European Patent Application No. 15168508.8, filed May 20, 2015, the contents of which are incorporated herein by reference in their entirety.

FIELD OF THE INVENTION

The present disclosure relates to a vehicle radar system where successive frequency ramps are generated and transmitted. When a ramp reaches a second high frequency, it is brought back to a first low frequency.

BACKGROUND

Many vehicle radar systems comprise radar transceivers that are arranged for generating so-called chirp signals that are transmitted, reflected and received by means of appropriate antennas comprised in the radar system. A chirp signal is an FMCW (Frequency Modulated Continuous Wave) signal with a certain amplitude where the frequency is continuously ramped between two values, the chirp signal thus being in the form of a continuous sinusoid where the frequency varies from a first low frequency to a second high frequency over the course of the ramp. Alternatively the ramp may be such that the frequency varies from a first high frequency to a second low frequency. The magnitude of the change in frequency from start to finish may for example be of the order of 0.5% of the starting frequency.

The received signals, thus constituted by reflected radar echoes, are mixed with the transmitted chirp signal in order to convert the received signals to baseband signals. These baseband signals, or IF (Intermediate Frequency) signals, are amplified and transferred in a plurality of channels to an Analog to Digital Converter (ADC) arrangement which is arranged to convert the received analog signals to digital signals. The digital signals are used for retrieving an azimuth angle of possible targets by simultaneously sampling and analyzing phase and amplitude of the received signals. The analysis is generally performed in one or more Digital Signal Processors (DSP:s) by means of Fast Fourier Transform (FFT) processing.

Each radar transceiver comprises its own oscillator, normally in the form of a VCO (Voltage Controlled Oscillator), which is controlled to vary the transmitted frequency from the first low frequency to the second high frequency via a phase-locked loop (PLL) which typically is achieved in a linear fashion. The frequency is controlled using a sequence of discrete frequency steps that approximate the desired frequency function. After such a frequency ramp, when a ramp reaches the second high frequency, it is brought back to the first low frequency in preparation for the next ramp in a single step. Such a step should be as short as possible, enabling fast successive ramps to be generated.

However, such a single step may result in an overshoot effect, where the frequency initially falls below the first low frequency. This is undesirable due to frequency restriction requirements, and may create interference with other frequency bands. This may for example be due to the inherent signal leakage from the oscillator to the radiating antennas and/or to radiation from feeding lines that distribute the oscillator signal to other devices.

In U.S. Pat. No. 8,638,139 this problem is solved by dividing the step into a number of equal and successively running smaller steps. However, a more versatile and efficient way to counteract an overshoot effect according to the above is desired.

The object of the present disclosure is thus to provide a vehicle radar system which is arranged for a more versatile and efficient way to counteract an overshoot effect when changing the frequency from the second high frequency to the first low frequency.

This object is achieved by a vehicle radar system having a control unit and a signal generator that is arranged to generate a least one FMCW (Frequency Modulated Continuous Wave) chirp signal. Each chirp signal forms a corresponding plurality of frequency ramps, and each frequency ramp runs between a first frequency and a second frequency. When a frequency ramp has reached the second frequency, the control unit is arranged to control the signal generator to start outputting an output signal with an output frequency for initializing a further frequency ramp by use of a frequency control signal corresponding to a desired frequency, where the desired frequency includes an initial desired frequency part and at least one further desired frequency part. The initial desired frequency part runs from the second frequency to an intermediate frequency having a magnitude between the first frequency and the second frequency. The further desired frequency part runs from the intermediate frequency to the first frequency for the further frequency ramp. The duration of the initial desired frequency part falls below the duration of the further desired frequency part.

This object is also achieved by means of method for a vehicle radar system, where the method includes the steps of:

Generating a least one FMCW (Frequency Modulated Continuous Wave) chirp signal, where each chirp signal uses a corresponding plurality of frequency ramps, where each frequency ramp runs between a first frequency and a second frequency.

Controlling an output frequency for initializing a further frequency ramp when a preceding frequency ramp has reached the second frequency, using a frequency control signal corresponding to a desired frequency, where the desired frequency includes an initial desired frequency part and at least one further desired frequency part. The initial desired frequency part runs from the second frequency to an intermediate frequency having a magnitude between the first frequency and the second frequency. The further desired frequency part runs from the intermediate frequency to the first frequency for the further frequency ramp. The duration of the initial desired frequency part falls below the duration of the further desired frequency part.

According to an embodiment of the present invention, the signal generator it is in the form of a VCO. For example, the VCO may be a phase-locked loop type, where the VCO is arranged to output a signal with a present output frequency.

According to another example of the present invention, the signal generator is in the form of a reference oscillator that is arranged to output a signal of a certain frequency, which signal is fed into a frequency converting unit. The frequency converting unit is arranged to multiply and/or divide the input signal, resulting in a signal having a reference frequency that is fed into a phase frequency detector. The present output frequency is fed back to the phase frequency detector via a frequency divider.

According to another example of the present invention, the control signal is arranged to set the divide-by ratios in the frequency divider and/or the frequency converting unit.

Other examples are disclosed in this specification and accompanying drawings.

A number of advantages are obtained by the present disclosure. Mainly, the overshoot effect is eliminated in a versatile and straight forward manner.

This could for example mean that a linear PLL (phase-locked loop) architecture could be employed in such a system, despite the non-linear nature of the desired waveform trajectory.

In a linear PLL architecture, it is often beneficial to reduce the bandwidth of the analog filter within the feedback loop, known as the loop filter. Reducing the bandwidth can have the beneficial effect of lowering the level of noise generated by the oscillator, known as phase noise. The present disclosure allows the loop bandwidth to be reduced in order to benefit the performance of the section of the waveform used for measurement without problems of overshoot during the fly-back section.

BRIEF DESCRIPTION OF THE DRAWINGS

The present disclosure will now be described more in detail with reference to the appended drawings, where.

DETAILED DESCRIPTION OF THE DRAWINGS

Figure 1:
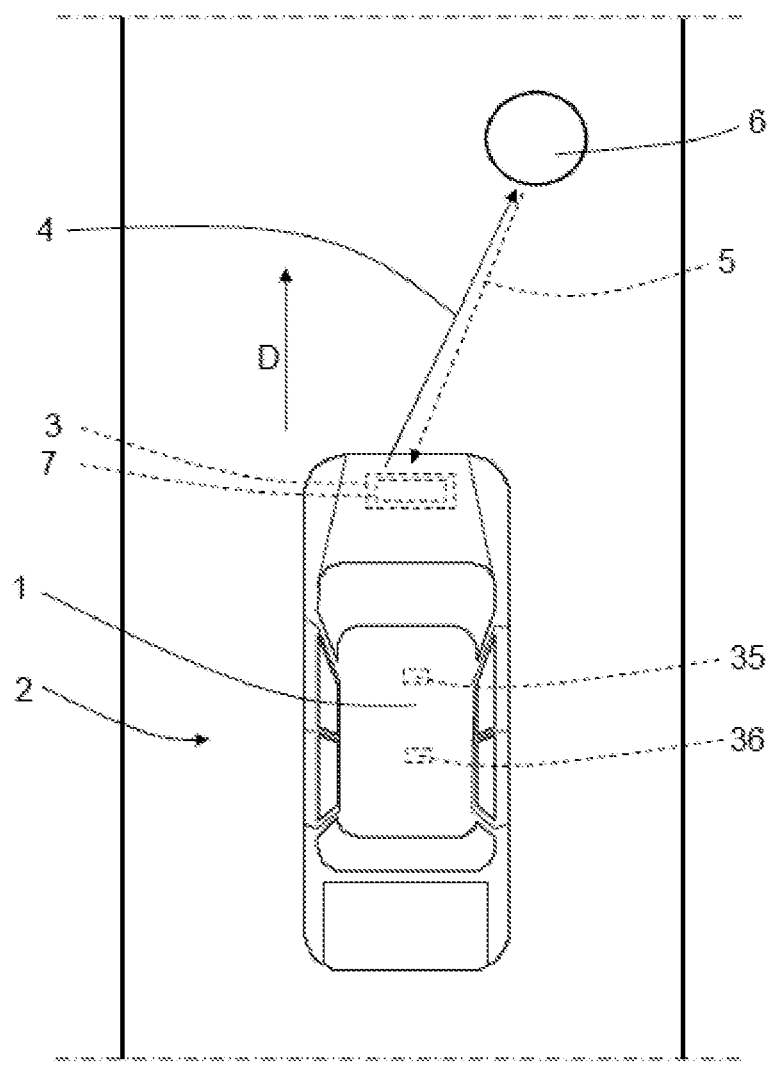
FIG. 1 shows a schematic top view of a vehicle.

FIG. 1 schematically shows a top view of a vehicle 1 arranged to run on a road 2 in a direction D, where the vehicle 1 includes a vehicle radar system 3 which is arranged to distinguish and/or resolve single targets from the surroundings by transmitting signals 4 and receiving reflected signals 5 and using a Doppler effect in a previously well-known manner. The vehicle radar system 3 is arranged to provide azimuth angles of possible objects 6 by simultaneously sampling and analyzing phase and amplitude of the received signals 5.

Figure 2:
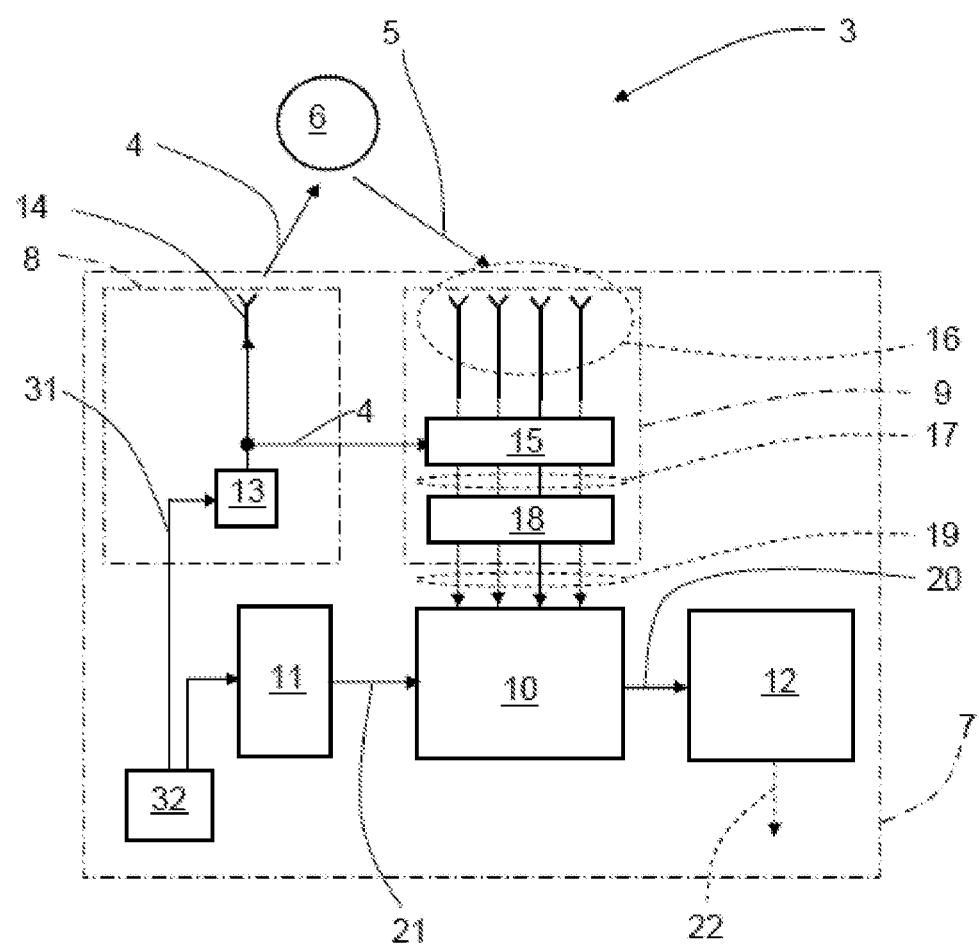
FIG. 2 shows a simplified schematic of a vehicle radar system.

With reference also to FIG. 2, the vehicle radar system 3 includes a transceiver arrangement 7 that is arranged for generating and transmitting sweep signals in the form of FMCW, Frequency Modulated Continuous Wave, chirp signals 4 of a previously known kind, and to receive reflected signals 5. The transceiver arrangement 7 includes a transmitter 8, a receiver 9, an Analog to Digital Converter (ADC) arrangement 10, a sampling and timing arrangement 11, a DSP (Digital Signal Processor) arrangement 12 and a control unit 32.

The transmitter 8 includes a signal generator arrangement 13 and a transmit antenna arrangement 14, where the control unit 32 is connected to the signal generator arrangement 13. The receiver 9 includes a receiver mixer 15 and a receiver antenna arrangement 16.

Figure 3:
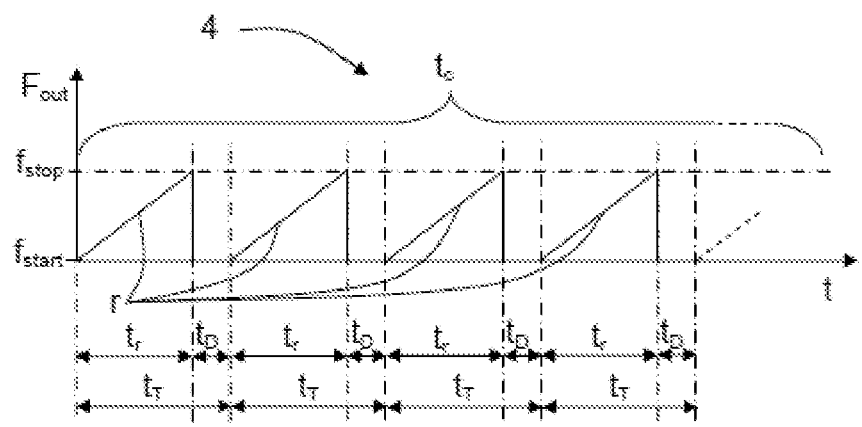
FIG. 3 shows a first chirp signal waveform.

With reference also to FIG. 3, the transmitter 8 is arranged to transmit a chirp signal 4, and the receiver 9 is arranged to receive reflected signals 5, where the transmitted chirp signal 4 has been reflected by an object 6.

A chirp signal 4 is in the form of a continuous sinusoid where the frequency varies from a first frequency $f_{start}$ to a second frequency $f_{stop}$ over the course of a ramp r, where the chirp signal 4 is in the form of repeating cycles of a plurality of frequency ramps r. There the magnitude of the first frequency $f_{start}$ falls below the magnitude of the second frequency $f_{stop}$. The change in frequency from start to finish for each ramp r may for example be of the order of 0.5% of the first frequency $f_{start}$.

A cycle for the chirp signal 4 lasts for a certain cycle time $t_c$, each ramp r lasts a certain ramp time $t_r$, having a ramp period time $t_T$. Between two consecutive ramps of the chirp signal 4 there is a delay time $t_D$, and during this delay time to the frequency of the signal generator 13 should be brought from the second frequency $f_{stop}$ to the first frequency $f_{start}$, sometimes referred to as the fly-back.

Referring back to FIG. 2, the reflected signals 5 are received by the receiver 9 via the receiver antenna arrangement 13. The received signals 5a, 5b, thus constituted by reflected radar echoes, are then mixed with the transmitted chirp signal 4 in the receiver mixer 15.

In this way, IF (Intermediate Frequency) signals 17 are acquired and filtered in an IF filter 18 such that filtered IF signals 19 are acquired.

The difference frequency of the filtered IF signals 19 relates to the target distance and are transferred from the receiver 9 to the ADC arrangement 10, where the filtered IF signals 19 are sampled at a certain predetermined sampling frequency $f_s$ and converted to digital signals 20, the sampling frequency $f_s$ being provided in the form of a sampling and timing signal 21 produced by the sampling and timing arrangement 11.

The DSP arrangement 12 that adapted for radar signal processing by means of a first FFT (Fast Fourier Transform) to convert the digital signals 20 to a range domain, and a second FFT to combine the results from successive chirp signal ramps into the Doppler domain. This results in Range-Doppler matrices 22 that are transferred for further processing, which is not further discussed here, many examples of such further processing being well-known in the art.

In the following, with reference to FIG. 4 that schematically shows a typical signal generator with a PLL, the signal generator 13 will be discussed more in detail.

The signal generator 13 as provided in the form of a voltage controlled oscillator (VCO) arrangement 23 that in turn formed from a bias generator 24 and a VCO 25 which are connected to each other in this order. The VCO 25 outputs a signal having a frequency that is tunable over a certain frequency range by supplying an input control voltage in a previously known manner. The signal generator 13 further includes a phase frequency detector 27, a charge pump 28, a low pass (loop) filter 29, a reference oscillator 37 and a frequency divider 30.

The output of the VCO 25, an actual output signal 4, here the chirp signal 4, with the present output frequency $F_{out}$, is fed back to the phase frequency detector 27 via the frequency divider 30. The reference oscillator 37 is arranged to output a signal of a certain frequency that is fed into a frequency converting unit 26 which is arranged to multiply and/or divide the input signal, resulting in a signal having a reference frequency $F_{ref}$ that is inputted into the phase frequency detector 27. The phase frequency detector 27 provides an up/down control signal 38 to the charge pump 28, which in turn is connected to the VCO arrangement 23 via the low pass (loop) filter 29. The reference oscillator 37 may for example be a high accuracy crystal oscillator with low phase noise.

Figure 4:
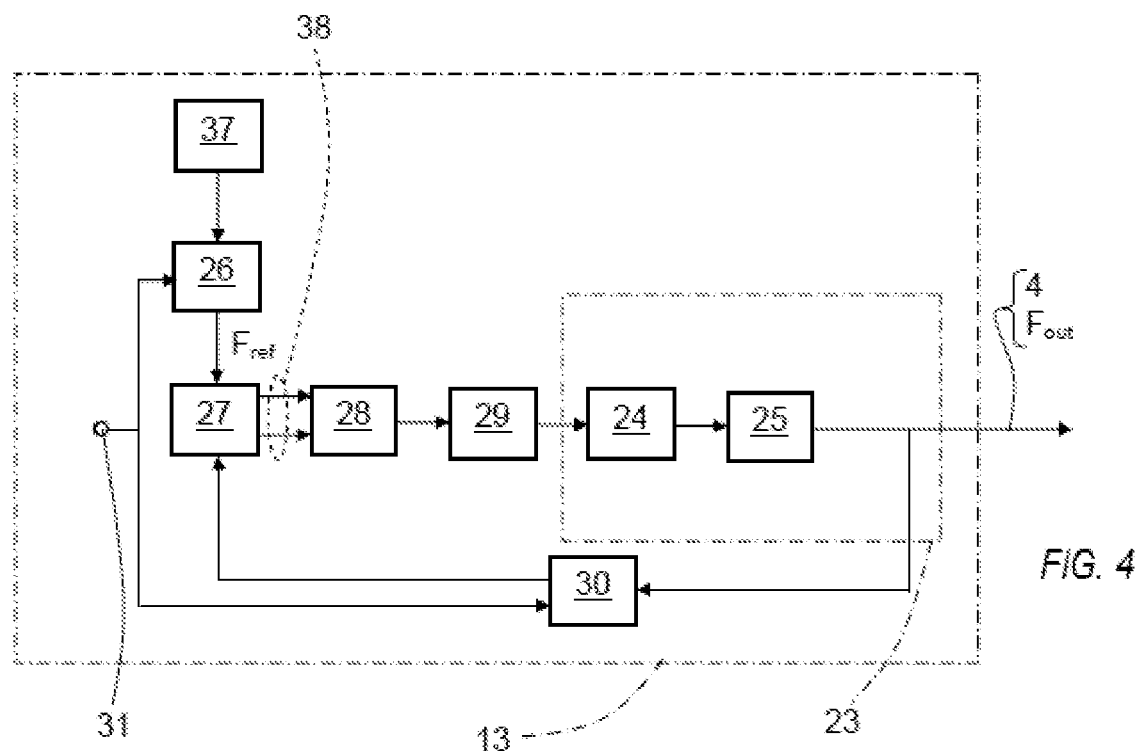
FIG. 4 shows details of a signal generator.

The control unit 32 is connected to the signal generator 13 and outputs a frequency control signal 31 to the signal generator 13 via this connection as indicated on FIG. 2 and FIG. 4. The frequency ramp is in practice defined by a number of discrete frequency steps (not shown). The discrete frequency steps are smoothed by the action of the loop filter. The steps may have a fixed or varying time duration using previously known techniques. The ramp is generated by varying the divider ratio in the frequency divider 30 and/or the frequency converting unit 26 over time, where the frequency control signal 31 is used to set the divide-by ratios in the frequency divider 30 and/or the frequency converting unit 26 as shown in FIG. 4, such that frequency steps are created. The ramp is made linear and smooth with the use of the loop filter 29.

Figure 5:
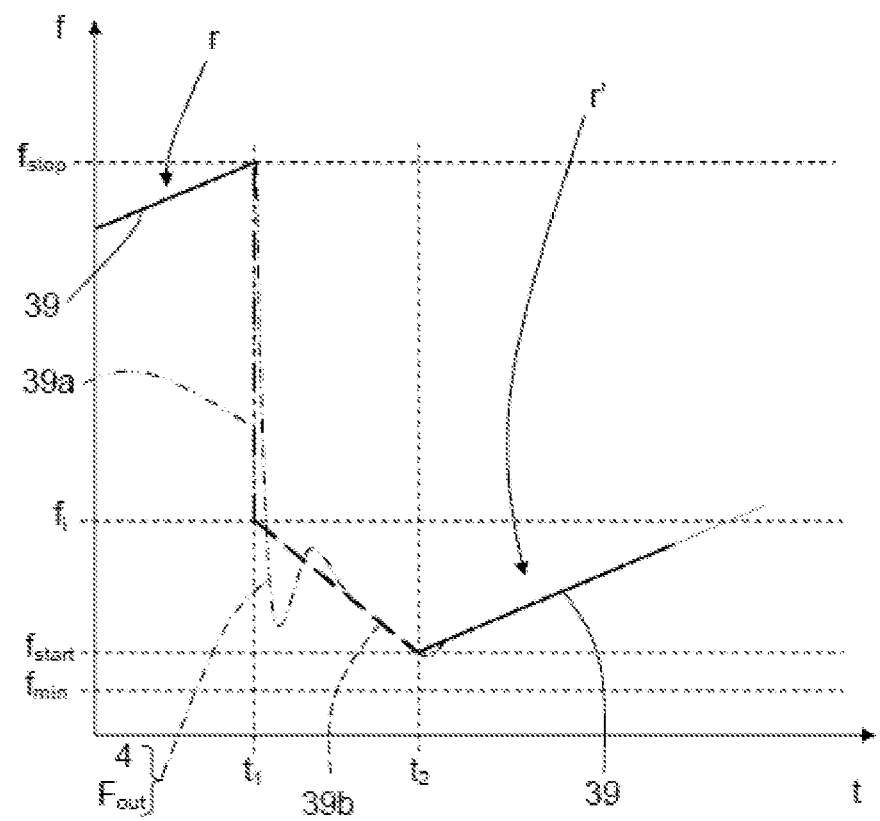
FIG. 5 shows a graphical presentation of a desired frequency and an output frequency.

FIG. 5 shows a desired frequency 39 as a function of time, indicated with a bold, initially solid, line, where the frequency control signal 31 corresponds to the desired frequency 39. Also shown in FIG. 5 is the frequency $F_{out}$ of the actual output signal 4 [[4]] of the signal generator 13, indicated with a dash-dotted line. For a certain desired frequency, there is a certain corresponding frequency control signal, such that a certain corresponding frequency control signal intends to control the VCO 25 to output an actual output signal 4 having a frequency $F_{out}$ that equals the desired frequency although, in reality, there are discrepancies such that the frequency $F_{out}$ of the actual output signal 4 differs from the desired frequency 39. This, for example, results in an overshoot that will be discussed later.

According to the present disclosure, the desired frequency 39 and the frequency $F_{out}$ of the actual output signal 4 coincide until a first time $t_1$ where the second frequency $f_{stop}$ is reached. Here, the present ramp r should end and the control unit 32 is then arranged to control the VCO arrangement 23 to start outputting a further frequency ramp r' based on the frequency control signal 31. The desired frequency 39 an initial desired frequency part 39a indicated with a bold dash-double-dotted line, and a further desired frequency part 39b indicated with a bold dashed line.

The initial desired frequency part 39a runs from the second frequency $f_{stop}$ to an intermediate frequency $f_i$ having a magnitude between the first frequency $f_{start}$ and the second frequency $f_{stop}$. The further desired frequency part 39b runs from the intermediate frequency $f_i$ to the first frequency $f_{start}$ for the further frequency ramp r'.

Here, there is a step from the second frequency $f_{stop}$ to the intermediate frequency $f_i$ for the initial desired frequency part 39a that in FIG. 5 is shown to occur at the first time $t_1$, and then the further desired frequency part 39b decreases until a second time $t_2$ that occurs later than the first time $t_1$, where the first frequency $f_{start}$ is reached. Then, the desired frequency 39 increases again, in accordance with the next frequency ramp r'. The curve slope (rate of change) of the initial desired frequency part 39a is greater than the slope of further desired frequency part 39b, as shown in FIG. 5. Also, as illustrated, the magnitude of frequency change over the initial frequency part is greater than the magnitude of change of frequency over the further desired frequency part.

How steep the step of the initial desired frequency part 39a is may of course vary, and generally the duration of the initial desired frequency part 39a falls below the duration of the further desired frequency part 39b.

In FIG. 5 it is evident that the frequency $F_{out}$ of the actual output signal 4 overshoots the intermediate frequency $f_i$ between the first time $t_1$ and the second time $t_2$ before coinciding with the desired frequency 39. However, the overshoot does not fall below a minimum frequency $f_{min}$ of the present frequency band. Due to an overshoot after the second time $t_2$, the minimum frequency $f_{min}$ falls below the first frequency $f_{start}$ in order to retain the frequency $F_{out}$ of the output signal 4 within the present frequency band.

The intermediate frequency $f_i$ would typically be set to be as close to the first frequency $f_{start}$ as possible in order to minimize the duration of the overshoot occurring after the second time $t_2$. This further allows the first frequency $f_{start}$ to be close to the minimum frequency $f_{min}$ which lets more of the available bandwidth be used for measurements. However if set too low, then the overshoot of the actual output signal's frequency $F_{out}$ during the further desired frequency part 39b may extend below the minimum frequency $f_{min}$ and hence create out of band interference. Generally, according to an example, the intermediate frequency $f_i$ is closer to the first frequency $f_{start}$ than the second frequency $f_{stop}$.

Figure 6:
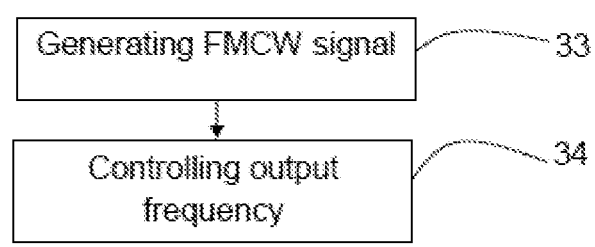
FIG. 6 shows a flowchart for a method according to the present disclosure.

With reference to FIG. 6, the present disclosure also relates to a method for a vehicle radar system 3, 3', where the method includes the steps of:

Step 33: Generating a least one FMCW (Frequency Modulated Continuous Wave) chirp signal 4, where each chirp signal 4 uses a corresponding plurality of frequency ramps r, where each frequency ramp r runs between a first frequency $f_{start}$ and a second frequency $f_{stop}$.

Step 34: Controlling an output frequency $F_{out}$ for initializing a further frequency ramp r' when a preceding frequency ramp r has reached the second frequency $f_{stop}$, using a frequency control signal 31 corresponding to a desired frequency 39. The desired frequency 39 includes an initial desired frequency part 39a and at least one further desired frequency part 39b. The initial desired frequency part 39a runs from the second frequency $f_{stop}$ to an intermediate frequency $f_i$ having a magnitude between the first frequency $f_{start}$ and the second frequency $f_{stop}$. The further desired frequency part 39b runs from the intermediate frequency $f_i$ to the first frequency $f_{start}$ for the further frequency ramp r'. The duration of the initial desired frequency part 39a falls below the duration of the further desired frequency part 39b.

As indicated in FIG. 1, the vehicle 1 includes a safety control unit 35 and safety system 36, for example an emergency braking system and/or an alarm signal device. The safety control unit 35 is arranged to control the safety system 36 in dependence of input from the radar system 3.

The present disclosure is not limited to the examples above, but may vary freely within the scope of the appended claims. For example, all times mentioned are of course only mentioned by way of example, any suitable times and timing schedules are clearly possible in a radar system according to the above. The ramp may similarly be configured as an up-ramp as described, or a down-ramp, or some combination of both.

The radar system may be implemented in any type of vehicle such as cars, trucks and buses as well as boats and aircraft.

The schematics of vehicle radar systems are simplified, only showing parts that are considered relevant for an adequate description of the present disclosure. It is understood that the general design of radar systems of this kind is well-known in the art. For example, no devices that are arranged to use the acquired target information is shown, but many different such devices are of course conceivable; for example a warning and/or collision avoidance system. The actual output signal 4 is indicated to be the actual chirp signal 4; this is only an example since there may be intermediate components positioned between the VCO's output and the transmit antenna arrangement 14 that alter the actual output signal 4 before being transmitted as the chirp signal 4.

The number of antenna arrangements, antennas within each antenna arrangement and IF signals may vary.

The ADC arrangement and the DSP arrangement should each one be interpreted as having a corresponding ADC or DSP functionality, and may each be constituted by a plurality of separate components. Alternatively, each ADC arrangement may be embodied in one ADC chip, and each DSP arrangement may be embodied in one DSP chip.

Each antenna arrangement 13a, 13b; 25a, 25b may for example include on or more antennas, and each antenna may be constituted by one antenna element or by an array of antenna elements.

Generally, the hardware used to generate the radar signal may be active only for part of the cycle period and powered down for the rest of the cycle, i.e. when it is not needed.

There may be more than one further desired frequency part following the initial desired frequency part 39a before the next ramp r' starts, but the duration of the initial desired frequency part always falls below the duration of any of such a further desired frequency part.

Other types of signal generators are possible, for example a signal generator working in an open-loop mode where the control signal is fed directly to the VCO. However, having a PLL decreases a possible VCO frequency drift with time and temperature, requiring calibration of the control signal in order to ensure that the VCO ramp is linear and stays within the desired band. Using a PLL results in that the VCO mainly stays within the desired band, and mainly is linear, without the need for such a calibration.

Terms such as coincide should not be interpreted as being mathematically exact, but within what is practical in this field of technology and present context. Here, the term coincide might be interpreted as closely follow.

Generally, the present disclosure relates to a vehicle radar system 3 having a control unit 32 and a signal generator 13 that is arranged to generate a least one FMCW (Frequency Modulated Continuous Wave) chirp signal 4. Each chirp signal 4 is formed of a corresponding plurality of frequency ramps r, and each frequency ramp r runs between a first frequency $f_{start}$ and a second frequency $f_{stop}$. When a frequency ramp r has reached the second frequency $f_{stop}$, the control unit 32 is arranged to control the signal generator 13 to start outputting an output signal 4 with an output frequency $F_{out}$ for initializing a further frequency ramp r' using a frequency control signal 31 corresponding to a desired frequency 39, where the desired frequency 39 is formed of an initial desired frequency part 39a and at least one further desired frequency part 39b, where the initial desired frequency part 39a runs from the second frequency $f_{stop}$ to an intermediate frequency $f_i$ having a magnitude between the first frequency $f_{start}$ and the second frequency $f_{stop}$, and where the further desired frequency part 39b runs from the intermediate frequency $f_i$ to the first frequency $f_{start}$ for the further frequency ramp r', where the duration of the initial desired frequency part 39a falls below the duration of the further desired frequency part 39b.

According to an example, the radar system 3 is arranged to provide input to a safety control unit 35 that in turn is arranged to control safety system 36, where the radar system 3, the safety control unit 35 and the safety system 36 are provided in a vehicle 1.

According to an example, the radar system 3 is arranged to:
Process all ramps in a cycle by a first FFT, (Fast Fourier Transform), to acquire target information at different ranges in a plurality of complex vectors that corresponds to the number of ramps in a cycle;
Analyze one vector element at a time for all complex vectors by means of a second FFT and then create a two-dimensional matrix in the Doppler domain providing data regarding range and relative speed.

According to an example, the signal generator 13 as provided in the form of a VCO 25.

According to an example, the VCO 25 is provided in the form of a phase-locked loop, where the VCO 25 is arranged to output a signal with a present output frequency $F_{out}$.

According to an example of the present invention, the signal generator 13 provided in the form of a reference oscillator 37 that is arranged to output a signal of a certain frequency, which signal is fed into a frequency converting unit 26, which frequency converting unit 26 is arranged to multiply and/or divide the input signal, resulting in a signal having a reference frequency $F_{ref}$ that is fed into a phase frequency detector 27, where the present output frequency $F_{out}$ is fed back to the phase frequency detector 27 via a frequency divider 30.

According to an example of the present invention, the frequency control signal 31 is arranged to set the divide-by ratios in the frequency divider 30 and/or the frequency converting unit 26.

Generally, the present disclosure also relates to a method for a vehicle radar system 3, where the method includes the steps of:
Step 33: generating a least one FMCW (Frequency Modulated Continuous Wave) chirp signal 4, where each chirp signal 4 uses a corresponding plurality of frequency ramps r, where each frequency ramp r runs between a first frequency $f_{start}$ and a second frequency $f_{stop}$; and
Step 34: controlling an output frequency $F_{out}$ for initializing a further frequency ramp r' when a preceding frequency ramp r has reached the second frequency $f_{stop}$, using a frequency control signal 31 corresponding to a desired frequency 39, where the desired frequency 39 forms an initial desired frequency part 39a and at least one further desired frequency part 39b, where the initial desired frequency part 39a runs from the second frequency $f_{stop}$ to an intermediate frequency $f_i$ having a magnitude between the first frequency $f_{start}$ and the second frequency $f_{stop}$, and where the further desired frequency part 39b runs from the intermediate frequency $f_i$ to the first frequency $f_{start}$ for the further frequency ramp r', where the duration of the initial desired frequency part 39a falls below the duration of the further desired frequency part 39b.

According to an example of the present invention, the method further includes the step of providing input to a safety control unit 35 that in turn is used to control safety system 36 in a vehicle 1.

According to an example of the present invention, a VCO 25 is used for outputting a signal with a present output frequency $F_{out}$, working in a phase-locked loop.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising, a control unit and a signal generator that is arranged to generate a least one Frequency Modulated Continuous Wave (FMCW), chirp signal, where the chirp signal comprises a corresponding plurality of frequency ramps, and where each frequency ramp within the plurality of frequency ramps runs from a first frequency to a second frequency, wherein when a frequency ramp has reached the second frequency, the control unit is arranged to control the signal generator to start outputting an output signal with an output frequency for initializing a further frequency ramp by a frequency control signal corresponding to a desired frequency, where the desired frequency is formed of an initial desired frequency part and at least one further desired frequency part, where the initial desired frequency part runs from the second frequency to an intermediate frequency having a magnitude between the first frequency and the second frequency, and where the further desired frequency part runs from the intermediate frequency to the first frequency for the further frequency ramp, where the duration of the initial desired frequency part falls below the duration of the further desired frequency part.

2. The vehicle radar system according to claim 1, further comprising the radar system is arranged to provide input to a safety control unit that in turn is arranged to control a safety system, where the radar system, the safety control unit and the safety system are comprised in a vehicle.

3. The vehicle radar system according to claim 1, further comprising in that the radar system is configured to:
   process of the frequency ramps in a cycle using a first, Fast Fourier Transform (FFT), to acquire target information at different ranges in a plurality of complex vectors that corresponds to the number of the frequency ramps in a cycle; and
   analyze one vector element at a time for all complex vectors using a second FFT and then create a two-dimensional matrix in the Doppler domain comprising data regarding range and relative speed.

4. The vehicle radar system according to claim 1, wherein the signal generator comprises a VCO.

5. The vehicle radar system according to claim 4, wherein the VCO is comprised in a phase-locked loop, where the VCO is arranged to output a signal with a present output frequency.

6. The vehicle radar system according to claim 5, wherein the signal generator comprises,
   a reference oscillator that is arranged to output a first signal of a certain frequency, which signal is fed into a frequency converting unit, which frequency converting unit is arranged to multiply or divide the first signal, resulting in a second signal having a reference frequency that is fed into a phase frequency detector, where the present output frequency is fed back to the phase frequency detector via a frequency divider.

7. The vehicle radar system according to claim 6, further comprising in that the frequency control signal is arranged to set divide-by ratios in the frequency divider or the frequency converting unit.

8. A method for operating a vehicle radar system comprising the steps of,
   generating a least one Frequency Modulated Continuous Wave (FMCW) chirp signal, where each chirp signal uses a corresponding plurality of frequency ramps, where each frequency ramp within the plurality of frequency ramps runs from a first frequency to a second frequency;
   controlling an output frequency for initializing a further frequency ramp when a preceding frequency ramp has reached the second frequency, using a frequency control signal corresponding to a desired frequency, where the desired frequency comprises an initial desired frequency part and at least one further desired frequency part, where the initial desired frequency part runs from the second frequency to an intermediate frequency having a magnitude between the first frequency and the second frequency, and where the further desired frequency part runs from the intermediate frequency to the first frequency for the further frequency ramp, where the duration of the initial desired frequency part falls below the duration of the further desired frequency part.

9. The method according to claim 8, wherein the method further comprises the step of providing input to a safety control unit that in turn is used to control a safety system in a vehicle.

10. The method according to claim 8, further comprising in that a VCO is used for outputting a signal with a present output frequency, working in a phase-locked loop.

11. The vehicle radar system according to claim 1, further comprising, the slope of the initial desired frequency part is greater than the slope of the further desired frequency part.

12. The vehicle radar system according to claim 1, further comprising, a magnitude of change in frequency over the initial desired frequency part is greater than a magnitude of the change in frequency over the further desired frequency part.

13. The vehicle radar system according to claim 1, wherein the output frequency falls below the intermediate frequency during the initial desired frequency part without falling below the second frequency.

14. The method for operating a vehicle radar system according to claim 8, further comprising, the slope of the initial desired frequency part is greater than the slope of the further desired frequency part.

15. The method for operating a vehicle radar system according to claim 8, further comprising, a magnitude of change in frequency over the initial desired frequency part is greater than a magnitude of the change in frequency over the further desired frequency part.

16. The method of operating a vehicle radar system according to claim 8, wherein the output frequency falls below the intermediate frequency during the initial desired frequency part without falling below the second frequency.

* * * * *